United States Patent [19]
Camboulives et al.

[11] 3,851,900
[45] Dec. 3, 1974

[54] SEALING DEVICES

[75] Inventors: André Alphonse Médéric Léon Camboulives, Savigny-Sur-Orge; Théophile Francois Le Maout, Cesson; Marc Roger Marchi, Melun; Roger Alfred Jules Vandenbroucke, Antony, all of France

[73] Assignee: Societe Nationale d'Etude et de Construction de Moteurs d'Aviation, Paris, France

[22] Filed: Sept. 14, 1973

[21] Appl. No.: 397,354

[30] Foreign Application Priority Data
Sept. 15, 1972 France .............................. 72.32848

[52] U.S. Cl.................. 285/231, 285/331, 285/332
[51] Int. Cl............................................. F16l 21/00
[58] Field of Search ........... 285/332, 231, 187, 345, 285/302, 331, 332.2; 277/138

[56] References Cited
UNITED STATES PATENTS
| | | | |
|---|---|---|---|
| 2,520,501 | 8/1950 | Guiler et al. ..................... | 285/302 X |
| 2,675,254 | 4/1954 | Davis et al. ...................... | 285/231 X |
| 2,827,311 | 3/1958 | Kasper............................. | 285/332 X |
| 3,418,809 | 12/1968 | Kopp .............................. | 285/187 X |

*Primary Examiner*—H. Hampton Hunter
*Attorney, Agent, or Firm*—William J. Daniel

[57] ABSTRACT

A sealing device designed for fitting to a conduit through which a fluid passes in operation, the conduit being composed of at least two sections which are axially consecutive and articulated to one another, the sealing device being of the type comprising, in the zone of junction of two consecutive conduit sections, a first abutment surface integral with one of the two sections and oriented in such manner as to be capable of taking a thrust having a component parallel to the axis of the conduit, a second abutment surface integral with the other section and oriented in such manner as to be capable of taking a thrust having a component normal to the axis of the conduit, and a sealing ring disposed coaxially with the said conduit in the immediate vicinity of the said abutment surfaces, wherein said sealing ring comprises a ring of variable peripheral length and a guide ring disposed coaxially with the conduit and having an oblique face turned towards and located in the immediate vicinity of the sealing ring, and means for applying the oblique face of the guide ring and the sealing ring resiliently one against the other in such a manner as to urge the sealing ring resiliently both to shift parallel to the axis of the conduit and to vary in peripheral length, and thus to apply the sealing ring simultaneously against the first abutment surface and the second abutment surface.

11 Claims, 12 Drawing Figures

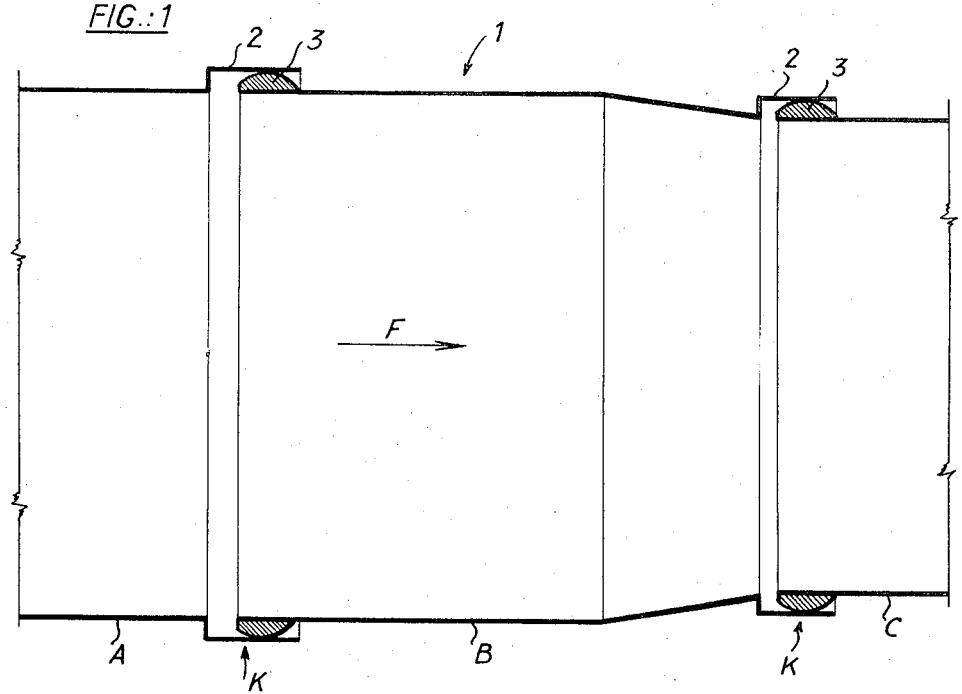
FIG.:1
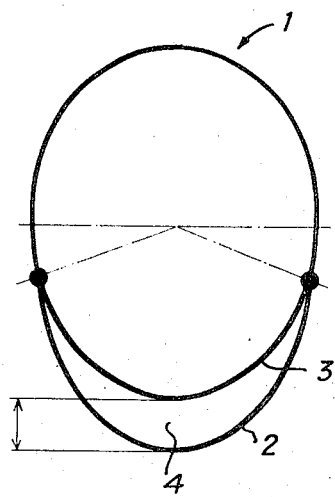
FIG.:2

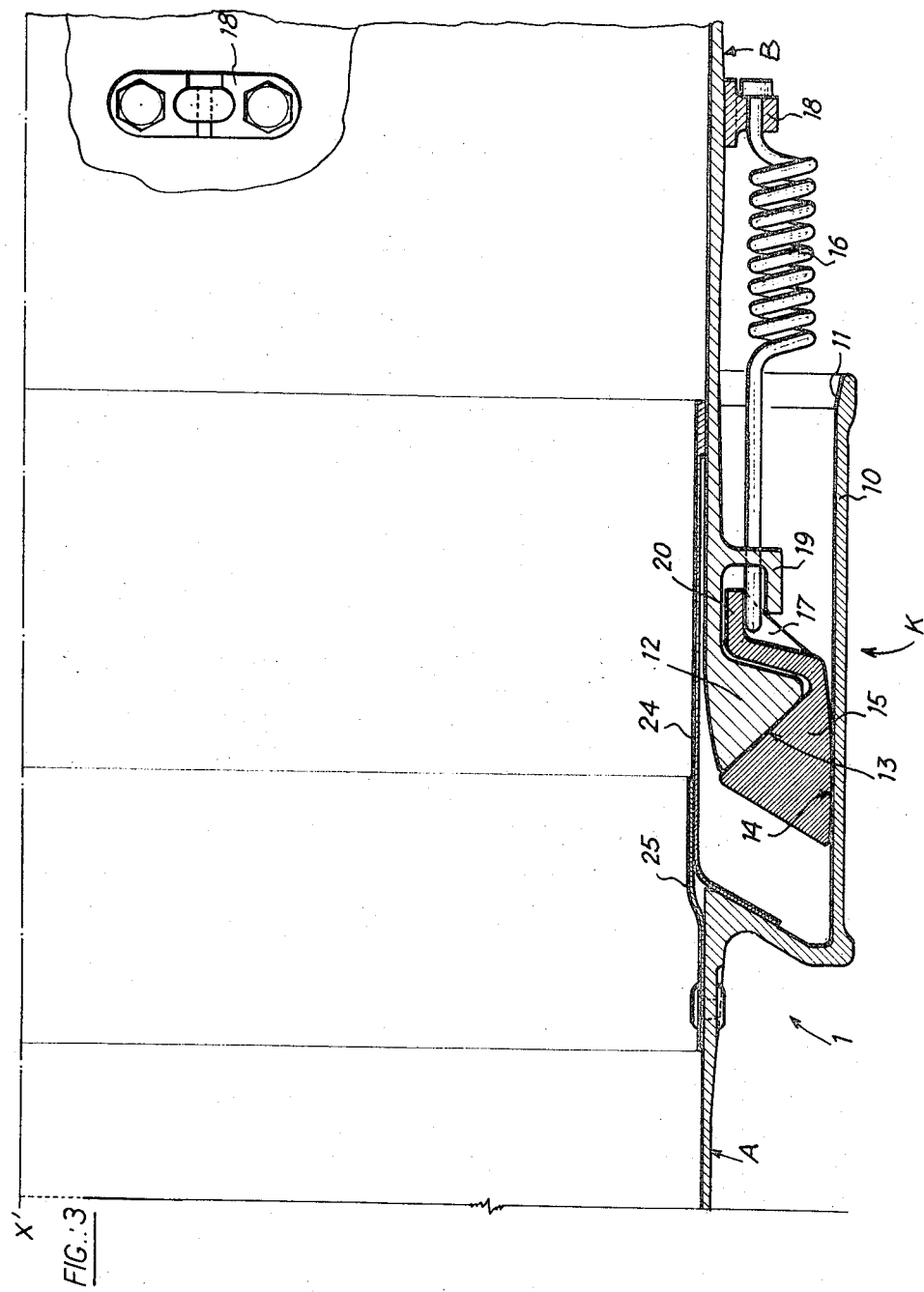

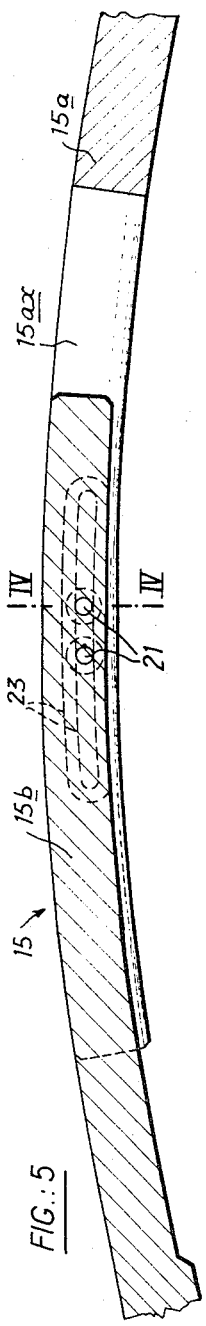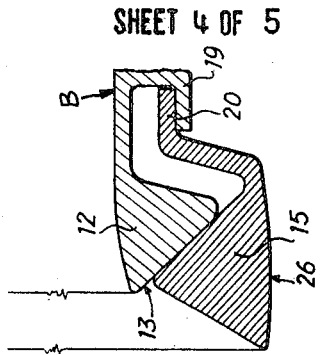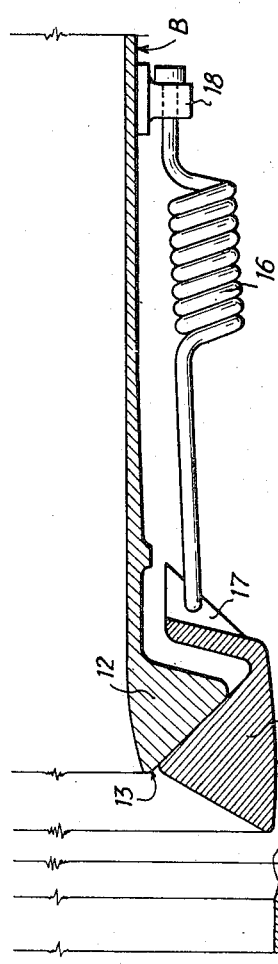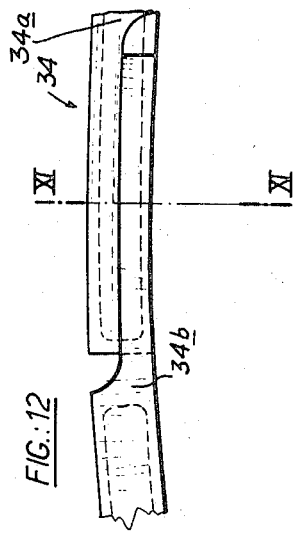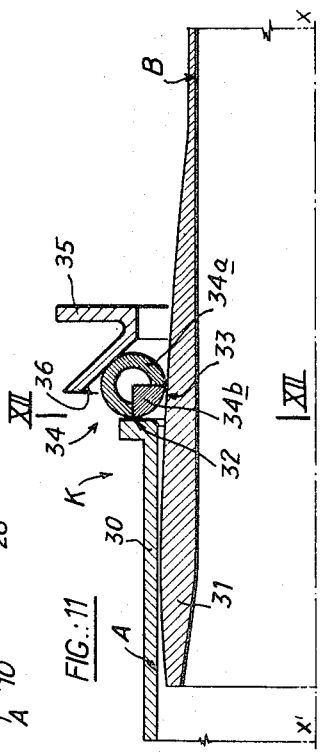
FIG.:5
FIG.:7
FIG.:12
FIG.:6
FIG.:11

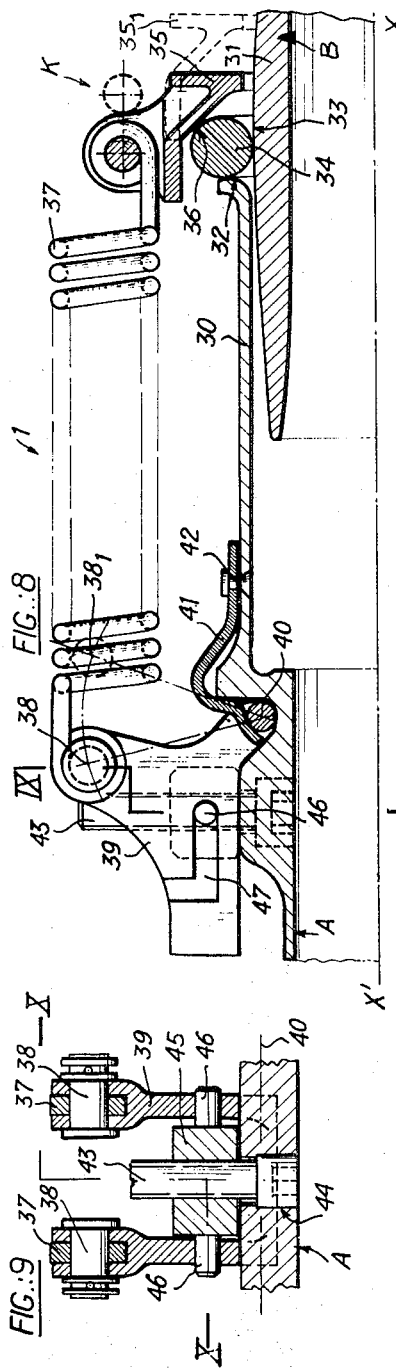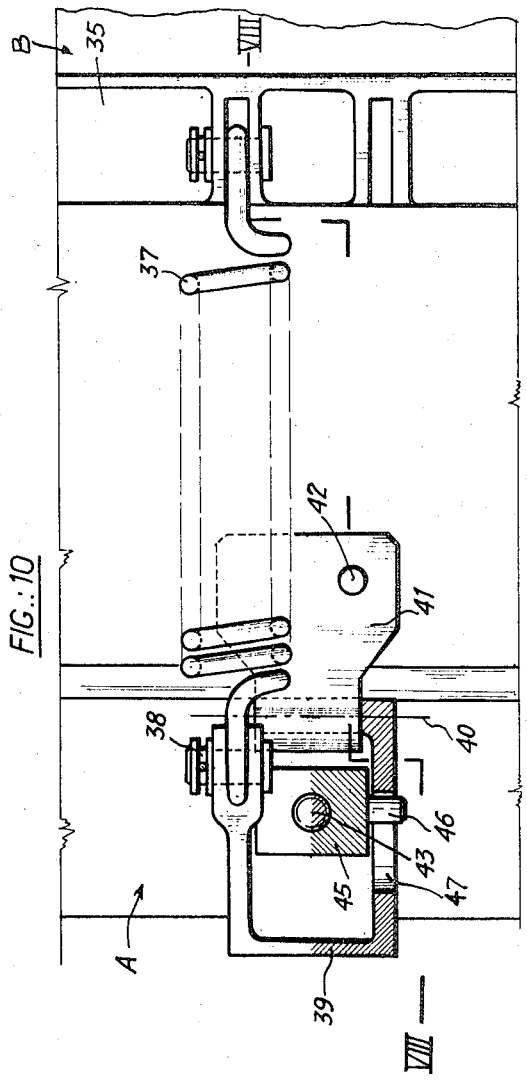

SEALING DEVICES

The present invention relates to a sealing device designed for fitting to a conduit through which a fluid passes in operation, the conduit being composed of at least two sections of conduit which are axially consecutive and articulated to one another. The invention applies more particularly, although not exclusively, to those cases in which the conduit is constituted by the casing of a propulsion unit or power plant, such as a gas turbine jet engine.

The fitting of a power plant to the airframe of an aeroplane sometimes requires that the various component parts (compressor, combustion chamber, turbine, ejection or after-burning duct, nozzle) of the power plant be grouped together to form two or three axially consecutive sub-assemblies or "sections" which are articulated one to the other.

In some cases, for example, the power plant is divided into two sections, namely an upstream section comprising the compressor, the combustion chamber and the turbine, and a downstream section comprising the ejection duct and the nozzle. The upstream section may be suspended from the airframe in an independent manner. As regards the downstream section, it may, on the one hand, be suspended by its rear portion from the airframe and, on the other hand, be centred and attached or coupled by its front portion to the upstream section by means of an articulated joint.

In other cases, the power plant is divided into three sections, namely an upstream section similar to the above-mentioned upstream section, an intermediate section comprising the ejection duct, and a downstream section comprising the nozzle. The upstream section and the downstream section may be suspended from the airframe independently of one another. The intermediate section, located between them, can be centred and coupled at the front to the upstream section and at the rear to the downstream section by means of articulated joints.

The aforesaid articulated joints are designed to absorb the deformations inherent in the operation of the power plant and/or in the flight of the aeroplane. They generally comprise, in their simplest form, a male collar or spherical joint member, a female collar and an internal flap which performs the function of a joint cover. A joint of this kind, which functions at high temperatures (of the order of 600°C to 700°C and even 800°C), is subjected to considerable forces of thermal origin (differential expansion) and mechanical origin (action of gravity and the various forces, such as propulsive or reverse thrust, reaction to changes of direction or altitude of flight of the aeroplane, which are exerted on the power plant). It tends, on this account, to become deformed and accentuate the slight initial play which generally exists between the male knuckle and the female collar and which is provided to facilitate the working of the joint. Under the influence in particular of gravity, this play gives rise to a leakage gap in the form of a crescent or lunule in the zone of the lower half of the joint. The fluid - tightness of this joint is therefore often inadequate.

The present invention aims to improve the fluid-tightness of such a joint.

To this end, the invention proposes, for the purpose of equipping a conduit composed of at least two sections which are axially consecutive and articulated to one another, a sealing device comprising, in combination, in the zone of junction of two consecutive conduit sections: a first abutment surface integral with one of the two sections and oriented in such manner as to be capable of taking a thrust having a component parallel to the axis of the conduit; a second abutment surface integral with the other section and oriented in such manner as to be capable of taking a thrust having a component normal to the axis of the conduit; a sealing ring disposed coaxially with the said conduit and movable with respect to the two sections in a direction parallel to the axis of the conduit, the ring having a variable peripheral length; and means urging the ring to shift parallel to the axis of the conduit and vary in peripheral length to apply the sealing ring simultaneously against the first and second abutment surfaces.

As will be seen hereinafter, a sealing device of this kind enables the leakage gap of crescent or lunule form to which reference has been made above to be effectively closed.

According to one arrangement of the invention, the aforesaid sealing ring is an open ring having at least two portions movable with respect to one another in the peripheral direction of the ring. Preferably, two peripherally consecutive portions of the sealing ring movable with respect to one another are arranged in mutually overlapping fashion so as to eliminate substantially all risk of escape or leakage between the ring portions.

According to a preferred arrangement of the invention, the means urging the sealing ring comprise a guide ring disposed coaxially with the conduit and having an oblique face turned towards and located in the immediate vicinity of the sealing ring, and means for applying the guide ring and the sealing ring against one another.

According to an embodiment applicable in this case, the guide ring is integral with one of the two conduit sections. The means for applying the sealing ring and the guide ring against one another may then advantageously comprise at least one spring one of the ends of which is fixed to the sealing ring and the other end of which is fixed to the conduit section integral with the guide ring. The aforesaid conduit section may likewise be integral with at least one auxiliary stop element arranged to limit the axial displacement and the peripheral deformation of the sealing ring under the action of the spring when the two conduit sections are separated from one another. The sealing ring, the guide ring, the spring and the conduit section bearing these various elements may therefore constitute a "modular" assembly which can be handled as a single block or piece.

According to another embodiment, the guide ring is movable with respect to the two conduit sections. The means for applying the sealing ring and the guide ring against one another may then advantageously comprise at least one spring one of the ends of which is fixed to the guide ring and the other end of which is fixed to one of the two conduit sections.

According to another arrangement of the invention, means are provided for adjusting the force of the spring used to apply the guide ring and the sealing ring against one another.

According to another arrangement of the invention, the aforesaid sealing ring performs at the same time the function of a spherical joint member between the conduit sections.

The invention will now be further described, by way of example, with reference to the accompanying drawings, in which:

FIG. 1 is a diagrammatic view in longitudinal section of a conduit composed of a plurality of axially consecutive sections articulated one to the other;

FIG. 2 is a diagrammatic view in cross-section illustrating the appearance of a leakage gap in the form of a crescent or lunule in the junction zone of the two axially consecutive conduit sections;

FIG. 3 is a half longitudinal sectional view of a conduit composed of at least two axially consecutive sections articulated one to the other, the conduit being equipped with a sealing device having a sealing ring of variable peripheral length, in accordance with a first embodiment of the invention, in the junction zone of two consecutive conduit sections;

FIG. 5 is a cross-sectional view, on the line V—V of FIG. 4, of a portion of the sealing ring shown in FIGS. 3 and 4;

FIGS. 6 and 7 are views similar to FIG. 3 illustrating the assembly or disassembly of two conduit sections;

FIG. 8 is a half longitudinal sectional view of a conduit composed of at least two axially consecutive sections articulated one to the other, the conduit being equipped with a sealing device having a sealing ring of variable peripheral length, in accordance with a second embodiment of the invention, in the junction zone of two consecutive conduit sections;

FIG. 9 is a cross-sectional view on the line IX—IX of FIG. 8 of the sealing device according to the said second embodiment;

FIG. 10 is a sectional view of the said sealing device on the line X—X of FIG. 9;

FIG. 11 is a half longitudinal sectional view, on the line XI—XI of FIG. 12, illustrating a detail of the sealing ring shown in FIG. 8; and FIG. 12 is a cross-sectional view, on the line XII—XII of FIG. 11, of a portion of the sealing ring shown in FIGS. 8 and 11.

Figure 4:
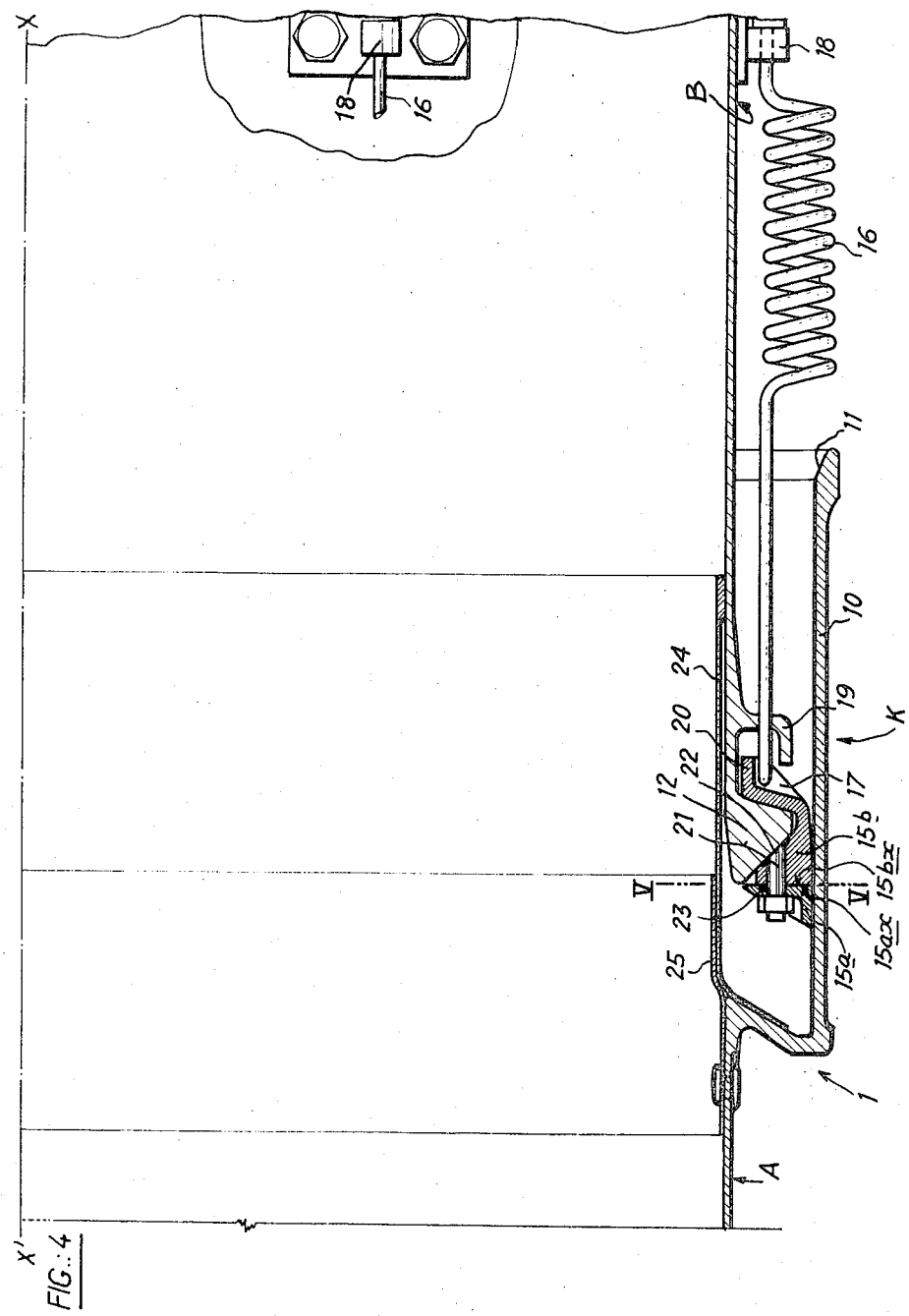
FIG. 4 is a half longitudinal sectional view, on the line IV—IV of FIG. 5, illustrating a detail of the sealing ring shown in FIG. 3.

FIG. 1 shows a conduit 1 through which a fluid F, such as a gaseous fluid at high pressure and temperature, flows during operation. This conduit is constituted, for example, by the casing of a jet propulsion unit or power plant such as a gas turbine jet engine. In the example shown, this casing is composed of three axially consecutive sections, namely an upstream section A comprising the compressor, the combustion chamber and the turbine, an intermediate section B comprising the ejection or afterburning duct, and a downstream section C comprising the propulsion nozzle.

To facilitate the fitting of the propulsion unit to the airframe (not shown) of an aeroplane, the successive sections, such as A and B, or B and C, are articulated to one another by means of joints K of the spherical type. Each joint K comprises a female collar 2 co-operating with a male collar 3 in the form of a spherical joint member, and also an internal flap (not shown) performing the function of a joint cover.

As has been explained hereinbefore, a joint such as K is subjected to considerable forces of thermal and mechanical origin which result in deformations of the joint and the appearance of a leakage gap 4 in the form of a crescent or lunule between the female collar 2 and the male collar 3 of the said joint. It is this leakage gap 4 which the improved sealing devices to be described hereinafter have the aim of closing.

A first embodiment of the invention will now be described with reference to FIGS. 3 to 7.

These figures show a conduit 1 having an axis X'-X and comprising two conduit sections A and B which are axially consecutive and articulated to one another in a junction zone K. The conduit section A is integral with a female collar 10 terminating in a chamfered edge 11.

The conduit section B is integral with a guide ring 12 having at its outer periphery an oblique face 13 formed, for example, by a conical, spherical or spheroconical surface portion. The oblique face 13 constitutes a first abutment surfaces integral with the section B and oriented in such manner as to be capable of taking a thrust having a component parallel to the axis X'-X of the conduit 1. A second abutment surface 14 is provided on the inner periphery of the female collar 10 integral with the conduit section A and it is oriented in such manner as to be capable of taking a thrust having a component normal to the axis of the conduit 1.

The abutment surfaces 13 and 14 form part of a sealing device described hereinafter for the conduit 1 in the junction zone K of the conduit sections A and B.

The essential element of this sealing device is a metal ring 15 coaxial with the conduit sections A and B and having an outer profile 26 (see FIGS. 6 and 7) in the form of a portion of a sphere. The ring 15 bears on the female collar 10 and thus serves as a spherical joint member or rolling element. Moreover, according to the invention, it is arranged to cooperate in sealing contact with the abutment surfaces 13 and 14 and it will therefore be referred to hereinafter by the term "sealing ring."

The sealing ring 15 is mounted to be movable with respect to the two sections A and B in a direction parallel to the axis X'-X of the conduit. Moreover, it has a variable peripheral length. Means which will be described in detail hereinafter urge this ring 15 to shift parallel to the axis X'-X of the conduit and to vary in peripheral length at the same time for the purpose of applying the ring simultaneously against the two abutment surfaces 13 and 14.

These urging means comprise, on the one hand, the guide ring 12 having an oblique face 13, which has already been described, and, on the other hand, a series of peripherally equidistant springs 16, each of which is fixed, by one of its ends, to a lug 17 integral with the sealing ring 15, and, by its other end, to a lug 18 fast with the conduit section B.

The conduit section B is also integral with at least one auxiliary stop element 19 arranged to co-operate under certain conditions with an extension 20 of the sealing ring 15, as will be explained hereinafter.

As shown in FIGS. 4 and 5, the sealing ring 15 may be an open ring having two or more portions (or segments) movable one with respect to the other in the peripheral direction of the ring. As can be seen, two peripherally consecutive portions 15a and 15b, movable one with respect to the other, of the ring 15 are arranged in mutually overlapping fashion along surfaces 15ax, 15bx sliding one on the other in substantially fluid-tight manner. The two ring portions 15a, 15b are guided one with respect to the other by means of two pins 21. The downstream portion of each of the pins 21 is welded to the ring portion 15b and rendered flush therewith at 22. The upstream portion of each of the pins 21 slides in a slot 23 formed in the ring portion 15a.

Two internal flaps 24, 25 fast with the conduit section A may also be provided to perform the function of a joint cover.

The sealing device according to the invention operates in the following manner :

The sealing ring 15 is applied strongly against the oblique face 13 of the guide ring 12 under the action of the springs 16 (and possibly under the action of the pressure of the fluid passing through the conduit 1). It therefore tends to "rise" along this oblique face. It is obvious in this connection that the inclination of the oblique face 13, and the inclination of that one of the surfaces of the ring 15 which is in contact with the said oblique face, are determined in advance, taking account of the coefficient of friction of the facing materials, so that the ring 15 may not remain wedged against the said oblique face.

This "rising" movement is manifested, on the one hand, by a displacement of the ring parallel to the axis X'-X of the conduit and, on the other hand, by an increase in the peripheral length of the said ring.

The sealing ring 15 thus remains applied simultaneously against the abutment surface 13 integral with the conduit section B and against the abutment surface 14 integral with the conduit section A, which ensures the desired fluid-tightness between the two conduit sections A and B. In particular, if a leakage gap in the form of a crescent or lunule appears (such as the leakage gap 4 which is shown diagrammatically in FIG. 2), this gap will be automatically closed — at least partially — by the sealing ring 15 of variable peripheral length.

It will also be noted that the overlapping of the portions 15a, 15b of the sealing ring 15 (see FIGS. 4 and 5) ensures satisfactory fluid-tightness at the "cut" in the said ring.

When the two conduit sections A and B are separated from one another (see FIGS. 6 and 7), the sealing ring 15 "rises" on the oblique face 13 of the guide ring 12 until the moment when the extension 20 of the ring strikes against the auxiliary stop element 19. The axial displacement and peripheral deformation of the ring 15 thus remain within predetermined limits, so that the relative arrangement of the main elements (sealing ring 15, guide ring 12, springs 16) which make up the sealing device is substantially preserved. The sealing device 12, 15, 16 thus constitutes a modular assembly which can be handled in a single block at the same time as the conduit section B.

On assembly of the two conduit sections A and B, the sealing ring 15 is presented to the chamfered edge 11 of the female collar 10 and a pressure on the conduit section B is then sufficient to cause the male assembly to fit into the female collar.

In the embodiment which has just been described, the sealing ring 15 of variable peripheral length performs the function of a spherical joint member element at the same time. This arrangement, however, is not obligatory, as will be seen hereinafter by reference to FIGS. 8 to 12.

FIGS. 8 to 12 relate to a second embodiment of the invention.

In these drawings, as before, two sections of a conduit 1 having an axis X'-X, which are axially consecutive and articulated to one another, are designated by the references A and B. The conduit section A is integral with a female collar 30. This collar terminates in a first abutment surface 32 oriented in such manner as to be capable of taking a thrust having a component parallel to the axis X'-X of the conduit. The conduit section B is integral with a male collar 31 of spherical form co-operating with the female collar 30. The male collar 31 has a second abutment surface 33 oriented in such manner as to be capable of taking a thrust having a component normal to the axis X'-X of the conduit.

A sealing ring 34 is disposed coaxially with the two conduit sections A and B. This ring is mounted to be movable with respect to the two sections A and B in a direction parallel to the axis X'-X of the conduit and it has a variable peripheral length.

A guide ring 35 disposed coaxially with the two conduit sections A and B is likewise mounted to be movable with respect to the said sections in a direction parallel to the axis X'-X of the conduit. The ring 35 has an oblique face 36 turned towards and located in the immediate vicinity of the sealing ring 34. Springs 37 distributed at the periphery of the conduit 1 enable the guide ring 35 and the sealing ring 34 to be applied one against the other so as to apply the sealing ring 34 simultaneously against the two abutment surfaces 32 and 33.

Each of the springs 37 is attached by one of its ends to the guide ring 35 and by its other end to a pin 38 forming part of a fork 39 carried by the conduit section A. Each of the forks is mounted to pivot about a tangential pin 40. This pin is held in a recess defined, at the outer periphery of the conduit section A, by a plate 41 with a rolled edge, which is itself fixed to the conduit section A by means of rivets 42.

The angular position of the fork 39 can be adjusted by means of a radial screw 43 turning in a seat 44 formed in the wall of the conduit section A. The screw 43 co-operates with a nut 45 arranged to move in a radial direction with respect to the conduit section A. The nut 45 is equipped with two fingers 46 each of which co-operates with a slot 47 formed in the fork 39. To cause the fork 39 to turn about the pin 40, it is therefore sufficient to turn the screw 43. In the course of this movement, the pin 38 fixing the spring 37 can thus pass from a position 38 to a position $38_1$ ( see FIG. 8). A means is thus available for adjusting the force of the spring 37.

The sealing ring 34 is an open ring having two or more portions (or segments) movable one with respect to the other in the peripheral direction of the ring. As shown in FIGS. 11 and 12, two peripherally consecutive portions 34a, 34b of the ring 34 which are movable one with respect to the other are disposed in mutually overlapping fashion. To this end, one of the portions 34a has at its end an aperture in the form of a sector covering one fourth of its section; the other portion 34b therefore has at its end a corresponding "wedge" in the form of a sector which slides in the aforesaid aperture. This arrangement enables the ring 34 to preserve a satisfactory peripheral fluid-tightness.

The sealing device which has just been described operates in the following manner :

The oblique face 36 of the guide ring 35 is applied strongly against the sealing ring 34 under the action of the springs 37. The sealing ring therefore tends to "descend" along the oblique face and this is manifested, on the one hand, by a shifting of the ring 34 parallel to the axis X'-X of the conduit, and, on the other hand, by a decrease in the peripheral length of the said ring.

The sealing ring 34 thus remains applied simultaneously against the abutment surface 32 integral with the conduit section A and against the abutment surface 33 integral with the conduit section B, which ensures the desired fluid-tightness between the two conduit sections A an B. In particular, if a leakage gap in the form of a crescent or lunule appears, such as the leakage gap 4 shown in FIG. 2, this gap will be automatically closed, at least partially, by the sealing ring 34 of variable peripheral length. It is obvious that, as in the case of the first embodiment, the inclination of the oblique face 36 is determined, taking account of the coefficient of friction of the facing materials, so that there may not be any wedging or jamming between the oblique face and the sealing ring 34.

For mounting and removing the sealing ring 34, it is sufficient to unscrew the screw 43 and this causes the pin 38 fixing the spring 37 to pass from the position 38 to the position $38_1$. The spring 37 then relaxes and permits movement of the guide ring 35 from the position 35 to the position $35_1$. The sealing ring 34 can thus be inserted or withdrawn easily.

We claim:

1. Sealing device designed for fitting to a conduit through which a fluid passes in operation, the said conduit being composed of at least two sections of conduit which are axially consecutive and articulated to one another, the said sealing device being of the type comprising, in the zone of junction of two consecutive conduit sections, a first abutment surface integral with one of said two sections and oriented in such manner as to be capable of taking a thrust having a component parallel to the axis of the conduit, a second abutment surface integral with the other of said sections and oriented in such manner as to be capable of taking a thrust having a component normal to the axis of the conduit, and a sealing ring disposed coaxially with said conduit in the immediate vicinity of said abutment surfaces, in which the said sealing ring comprises a ring of variable peripheral length and the said sealing device moreover comprises a guide ring, disposed coaxially with the conduit and having an oblique face turned towards and located in the immediate vicinity of said sealing ring, and means for applying said oblique face of the guide ring and said sealing ring resiliently against one another in such manner as to urge said sealing ring resiliently both to shift parallel to the axis of the conduit and to vary in peripheral length, and thus to apply said sealing ring simultaneously against said first abutment surface and said second abutment surface.

2. Sealing device as claimed in claim 1, in which said sealing ring is an open ring having at least two portions movable one with respect to the other in the peripheral direction of said ring.

3. Sealing device as claimed in claim 2, in which two peripherally consecutive portions of said sealing ring movable one with respect to the other are arranged in mutually overlapping fashion.

4. Sealing device as claimed in claim 1, in which said guide ring is integral with one of said two conduit sections.

5. Sealing device as claimed in claim 4, in which the means for applying said sealing ring and said guide ring against one another comprise at least one spring having two ends, one of said spring ends being fixed to the sealing ring and the other spring end being fixed to the conduit section integral with said guide ring.

6. Sealing device as claimed in claim 5, in which said conduit section is likewise integral with at least one auxiliary stop element arranged to limit the displacement and deformation of the sealing ring under the action of said spring when the two conduit sections are separated from one another.

7. Sealing device as claimed in claim 5, in which means are provided for adjusting the force of said spring.

8. Sealing device as claimed in claim 1, in which said guide ring is movable with respect to the said two conduit sections.

9. Sealing device as claimed in claim 8, in which the means for applying said sealing ring and said guide ring against one another comprise at least one spring having two ends, one of said spring ends being fixed to said guide ring and the other spring end being fixed to one of the said two conduit sections.

10. Sealing device as claimed in claim 9, in which means are provided for adjusting the force of the spring.

11. Sealing device as claimed in claim 1, in which said sealing ring performs at the same time the function of a spherical joint element between the said conduit sections.

* * * * *